United States Patent [19]

Hudson et al.

[11] Patent Number: 5,435,475
[45] Date of Patent: Jul. 25, 1995

[54] RIDE-READY BIKE CARRIER SYSTEM

[75] Inventors: James B. Hudson; Ron Holder, both of Laguna Niguel; Julie L. Gengler, Alta Loma, all of Calif.

[73] Assignee: Sport Carriers, Inc., Colton, Calif.

[21] Appl. No.: 146,883

[22] Filed: Nov. 2, 1993

[51] Int. Cl.⁶ .................................................. B60R 9/00
[52] U.S. Cl. ................................ 224/324; 224/546; 224/552; 224/553; 224/558; 224/570; 224/571; 224/924
[58] Field of Search ............... 224/324, 42.03 B, 309, 224/315; 211/5, 19, 20, 21, 22, 17

[56] References Cited

U.S. PATENT DOCUMENTS 4,524,893  6/1985  Cole ........................... 224/42.03 B
4,635,835  1/1987  Cole ........................... 224/42.03 B
5,052,605  10/1991  Johansson ..................... 224/324

Primary Examiner—Linda J. Sholl
Attorney, Agent, or Firm—Lyon & Lyon

[57] ABSTRACT

A ride-ready bike carrier system has a support arm and handle assembly attached to a rear wheel holder via an extension arm, such that the handle assembly can engage a bike frame and wheel axle combination to further secure and stabilize a bike upon the system. The support arm and handle assembly, as well as the rear wheel holder, can be positioned such that the system can secure and stabilize bikes having wheels of differing size. Furthermore, since the handle assembly engages a portion of the bicycle which, for the most part, is consistent in size and design from one manufacturer to another, design incompatibilities are minimized.

3 Claims, 5 Drawing Sheets

RIDE-READY BIKE CARRIER SYSTEM

FIELD OF INVENTION

This invention relates to bike carriers, specifically to a roof-mounted ride-ready bike carrier system.

BACKGROUND OF THE INVENTION

While there are many conceivable ways to carry a bike on the exterior of a vehicle, one general classification would encompass roof-mounted bike carrier systems.

Basically, there are two types of bike carrier systems being used today to transport bikes on the rooftop of a vehicle. There is the fork-mount bike carrier system and the upright bike carrier system.

In the first type of bike carrier system, the fork-mount bike carrier system, the front wheel of the bicycle must be removed so that the front wheel forks can be mounted and secured into a holding device. By securing the front wheel forks, the bicycle is further stabilized. The rear wheel remains attached to the bike and is secured to the bike carrier via a wheel holding device.

In the second type of bike carrier system, the upright bike carrier system, the user can transport a bicycle without having to remove the front wheel. This means that the bike will be in a ride-ready configuration when removed from the upright bike carrier system. With this system, both the front and rear wheels are secured to the bike carrier via a wheel holding device. For further security and stability, the bike can be stabilized through the use of a support arm that engages the front down tube of the bicycle frame.

However, both of these bike carrier systems have some shortcomings. For example, one of the disadvantages of the first type of system, the fork-mount bike carrier system, is that it is very inconvenient and time consuming to remove the front wheel from the bike whenever the bike is mounted to the system, and to put the front wheel back on whenever the bike is removed from the system.

Furthermore, one of the disadvantages of the second type of system, the upright bike carrier system, is that the support arm used to secure and stabilize the bike is designed to hold a traditionally-shaped cylindrical front down tube of a bike frame. However, many of the newer and technologically advanced bicycle frame designs utilize various different materials and non-cylindrical shapes for the front down tube of the bike frame.

Thus, the currently available upright bike carrier systems would be unable to accommodate any of these newer bikes, which utilize various non-cylindrical shapes for the front down tube of the bike frame. A different, custom designed, support arm would be required every time a bike of differing shape needs to be secured and stabilized on an upright bike carrier system.

In addition, another disadvantage of the upright bike carrier system is that an excessive retaining force exerted by the support arm on the front down tube of the bicycle frame could crush or deform the front down tube.

Therefore, there is a need for an improved bike carrier system which would enable a user to transport a bike in a ride-ready configuration, and would further enable that user to attach a bike, of any shape, to the bike carrier without the need for specially shaped supporting arm adapters, and without concern for damage to the bicycle frame.

SUMMARY OF THE INVENTION

The ride-ready bike carrier system of the present invention is meant to be attached to the crossbars of an existing vehicle roof rack system.

The ride-ready bike carrier system comprises a tire bar which is mounted onto a first and a second crossbar by a first and second tire bar clamp, respectively. Prior to mounting the tire bar onto the crossbars, a first and a second wheel holder is placed onto the tire bar in between the first and second crossbar, such that once the tire bar is mounted, the wheel holders can be moved back and forth on the tire bar, but preferably cannot be removed off of the tire bar.

A unique supporting arm and handle assembly are attached to the second tire bar clamp via an extension arm. In another embodiment, the supporting arm and handle assembly can be attached to either the tire bar or the crossbar via the extension arm. The supporting arm pivots about a support arm pivot in a semi-circular back-and-forth motion in the same longitudinal direction as the tire bar, and perpendicular to the crossbar.

The handle assembly comprises a handle housing and a pivoting handle. The handle housing has a U-clamp attached to it via a U-clamp bolt. This U-clamp is for engaging the combination of a second wheel axle and a bike frame, and securing the combination to the support arm and handle assembly. In another embodiment, the U-clamp can engage the combination of a first wheel axle and a bike frame.

The pivoting handle pivots about a pivoting handle pivot such that a cone adjuster nut, integral to the pivoting handle, is retracted into the handle housing (the open position) to allow passage of an end of the second wheel axle to a position directly in front of the cone adjuster nut, whereby returning the pivoting handle to its former position (the closed position) allows the cone adjuster nut to engage with the end of the axle, thereby securing the support arm and handle assembly to the bike frame and wheel axle combination. The cone adjuster nut is adjustable for better engagement with the bike frame and wheel axle combination.

Unlike the prior art which uses the support arm to attach to a portion of the bike that varies in size and shape from bike to bike, namely, the front down tube of the bike frame, the bike carrier system of present invention secures onto the wheel axle and bike frame combination, which is more constant in shape, and less likely to differ from one bicycle manufacturer to another. With the system of the present invention, a user can transport bikes of various shapes and sizes in a ride-ready position, without any incompatibility problems between the support arm and the bike, and without any concern for damage to the front down tube of the bicycle frame.

Furthermore, since the wheel holder can be moved back and forth on the tire bar, the size of a wheel, i.e. its radius, will not affect the ability of the support arm and handle assembly to engage the bike frame and wheel axle combination. The pivoting motion of the arm in a semi-circular motion gives the arm a varying radius in which it can engage the axle of a wheel of varying size.

Accordingly, several objects and advantages of the present invention are described below.

Therefore, an object of this invention is to provide an improved ride-ready bike carrier.

Another object of this invention is to provide an improved ride-ready bike carrier that will accommodate bicycles of various frame shapes.

A further object of this invention is to provide an improved ride-ready bike carrier that will accommodate bicycles of various wheel sizes.

Yet another object of this invention is to provide an improved ride-ready bike carrier that will minimize damage to the bicycle frame.

Further objects and advantages of the present invention will become apparent from a consideration of the drawings and ensuing description.

DESCRIPTION OF THE PREFERRED EMBODIMENT

Figure 1A:
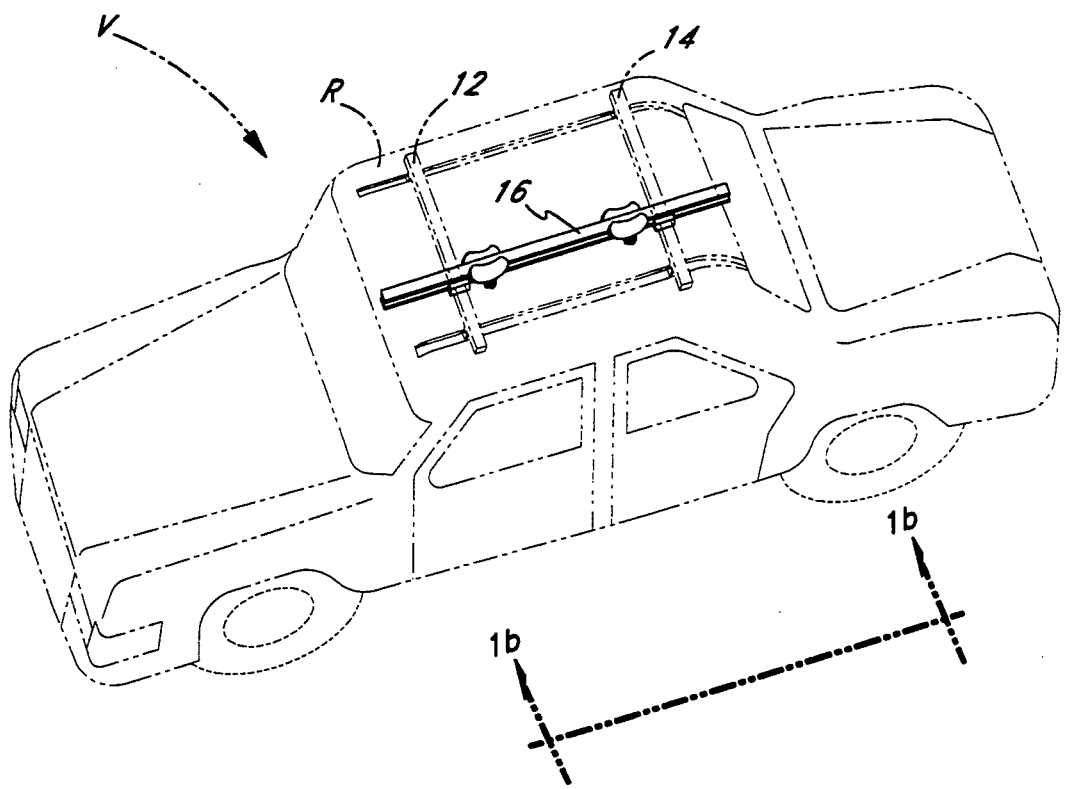
FIG. 1a is a perspective view of a tire bar attached to a vehicle's existing crossbar rack system.
Figure 1B:
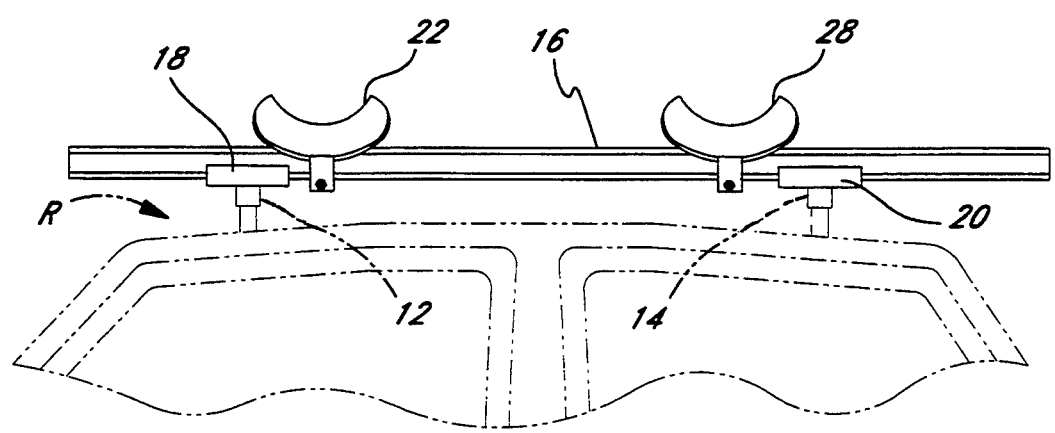
FIG. 1b is a side view of a tire bar attached to a vehicle's existing crossbar rack system.

Referring to FIG. 1a, a vehicle V with a tire bar 16 attached to a first and a second crossbar, 12 and 14 respectively, of the vehicle's V existing roof rack system, is shown. Shown in more detail in FIG. 1b is a side view of the vehicle V with the roof R of the vehicle V supporting the tire bar 16 which is attached to the first and second crossbar, 12 and 14 respectively, via a first and second tire bar clamp, 18 and 20 respectively. Placed on the tire bar 16 prior to mounting the tire bar 16 to the first and second crossbars, 12 and 14, are a first and a second wheel holder, 22 and 28 respectively.

Figure 2:
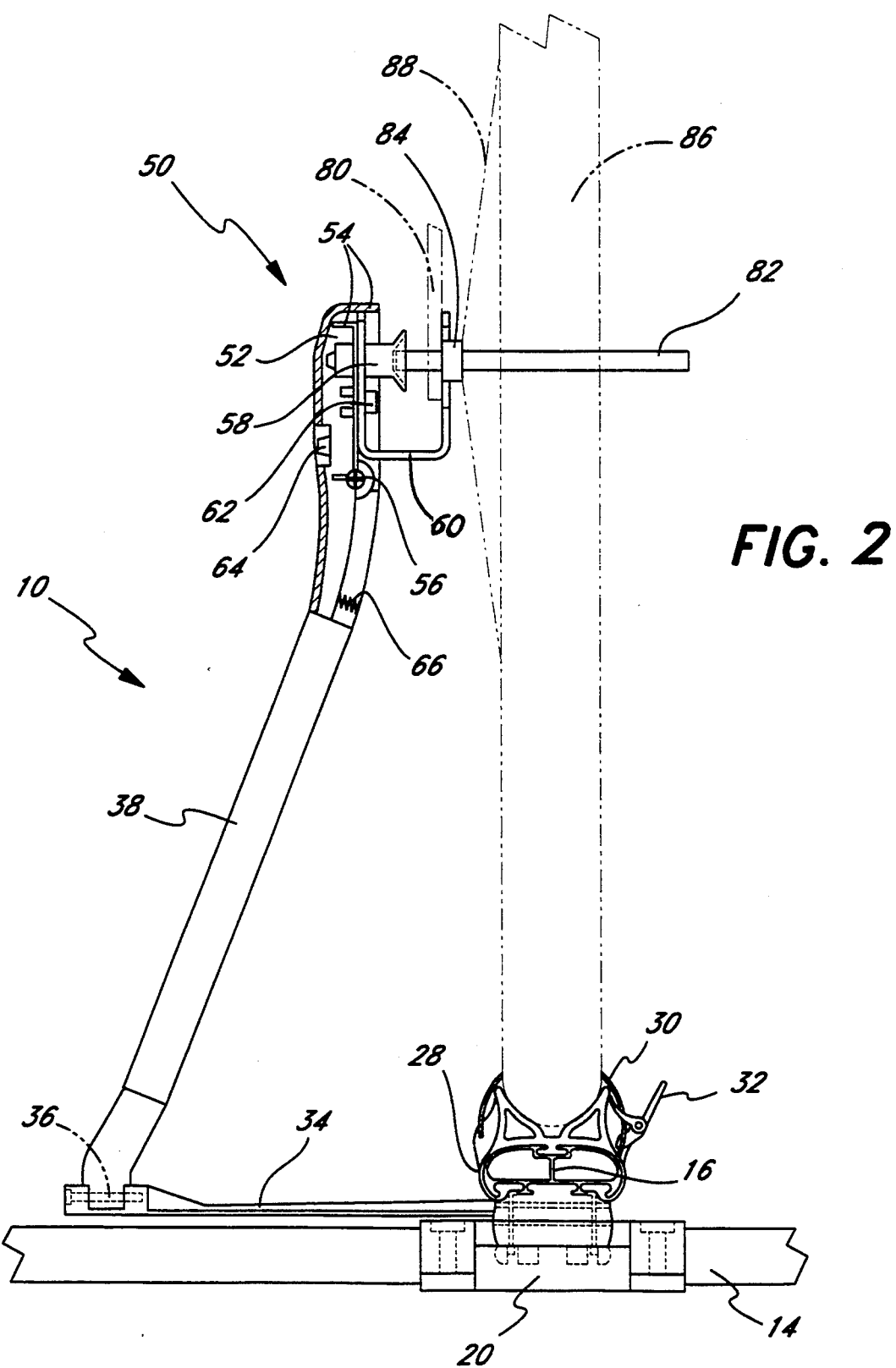
FIG. 2 is a frontal view of a support arm and handle assembly, in a closed position, attached to the second crossbar of a vehicle's existing crossbar rack system.

Turning now to FIG. 2, this is a frontal view of half of a ride-ready bike carrier system 10. This figure shows the second crossbar 14 only, and does not show the first crossbar 12 or its associated components.

In FIG. 2, the tire bar 16 is attached to the second crossbar 14 via the second tire bar clamp 20. The second wheel holder 28 is located on the tire bar 16 closer to the second crossbar 14 than the first crossbar 12. The first wheel holder 22 (better shown in FIG. 1b) is located on the tire bar 16 closer to the first crossbar 12 than the second crossbar 14. The first and second wheel holder, 22 and 28 respectively, comprise a first and second wheel holder strap, 24 and 30 respectively, and a first and second wheel holder lever, 26 and 32 respectively.

A second wheel 86 can be secured to the tire bar 16 via the second wheel holder 28 by placing the second wheel holder strap 30 around the second wheel 86 and tightening the second wheel holder strap's 30 grasp about the second wheel 86 with the second wheel holder lever 32. A first wheel 85 (not shown) can be secured to the tire bar 16 via the first wheel holder 22 in a similar manner.

Extending from the second tire bar clamp 20 is an extension arm 34 having a support arm pivot 36 on the end not attached to the second tire bar clamp 20. Attached to the support arm pivot 36 in an interlocking pivotal relationship is a support arm 38, wherein said support arm 38 can rotate about the support arm pivot 36 in a semi-circular arc in the same direction as the tire bar 16.

Attached to the support arm 38 on the end not attached to the support arm pivot 36 is a handle assembly 50. The handle assembly 50 comprises a pivoting handle 52 and a handle housing 54. A U-clamp 60 is attached to the handle housing 54 via a U-clamp bolt 62. The pivoting handle 52 pivots about a pivoting handle pivot 56. A spring 66 tensions the pivoting handle 52 toward a closed position, the closed position being when the pivoting handle 52 is flush with the handle housing 54.

Integral to the pivoting handle 52 is a cone adjuster nut 58 for engaging an end of an axle 82 of a bicycle's B second wheel 86, thereby securing the support arm 38 and handle assembly 50 to a bike frame 80 and the wheel axle 82 combination. The cone adjuster nut 58 can be adjusted for tighter engagement with the bike frame 80 and wheel axle 82 combination. A wheel axle nut 84 secures the bike frame 80 to the wheel axle 82. The second wheel 86 is supported about the wheel axle 82 via a plurality of wheel spokes 88.

The handle assembly 50 further comprises a locking mechanism 64 for providing additional tension to the end of the wheel axle 82 beyond that supplied by the tension in the spring 66, and to lock the handle assembly 50 in the closed position for additional security.

Figure 3:
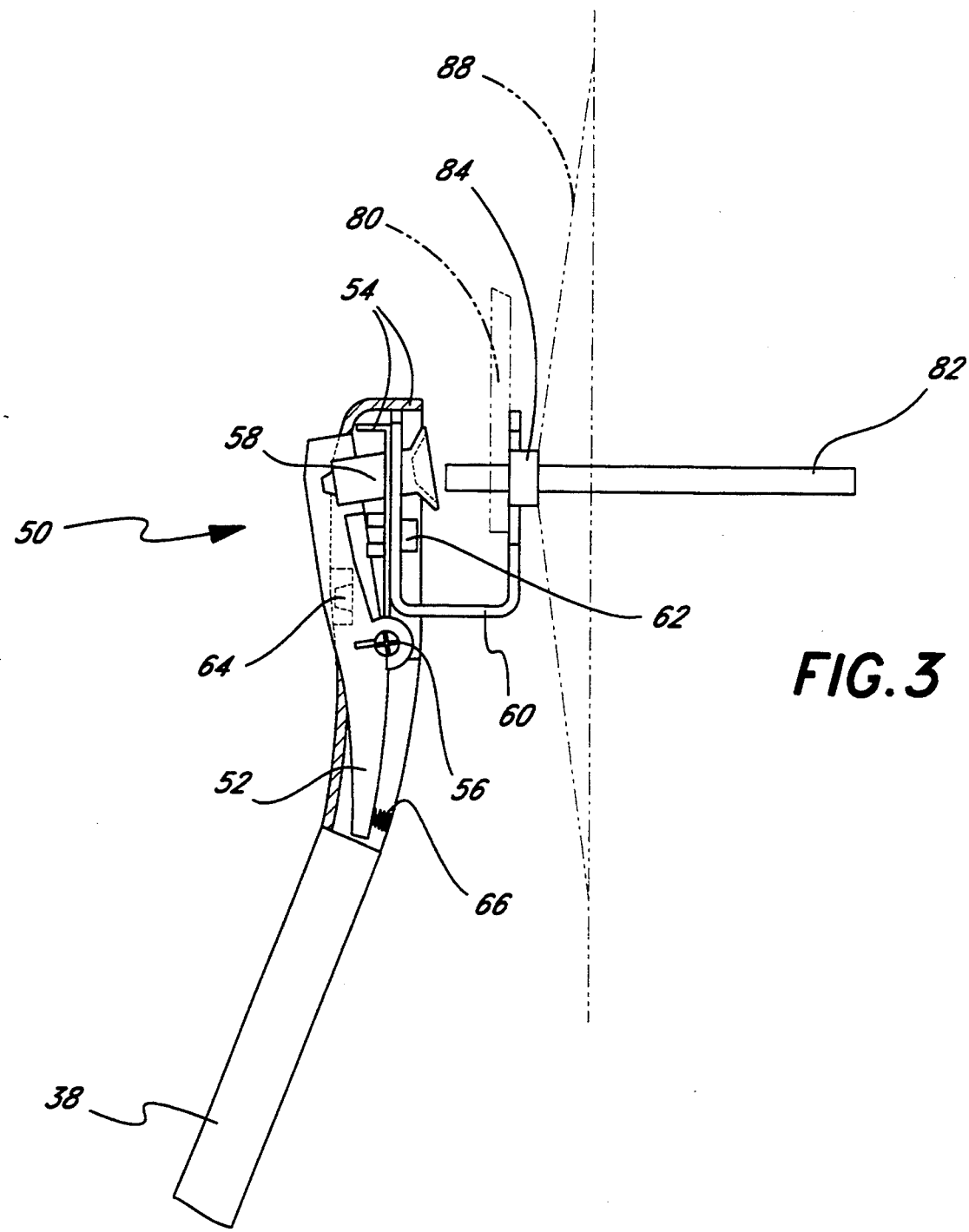
FIG. 3 is a frontal view of the handle assembly in an open position.

FIG. 3 illustrates the handle assembly 50 wherein the pivoting handle 52 is in an open position, the open position being when the cone adjuster nut 58 is retracted into the handle housing 54 and the pivoting handle 52 protrudes from the handle housing 54.

Figure 4:
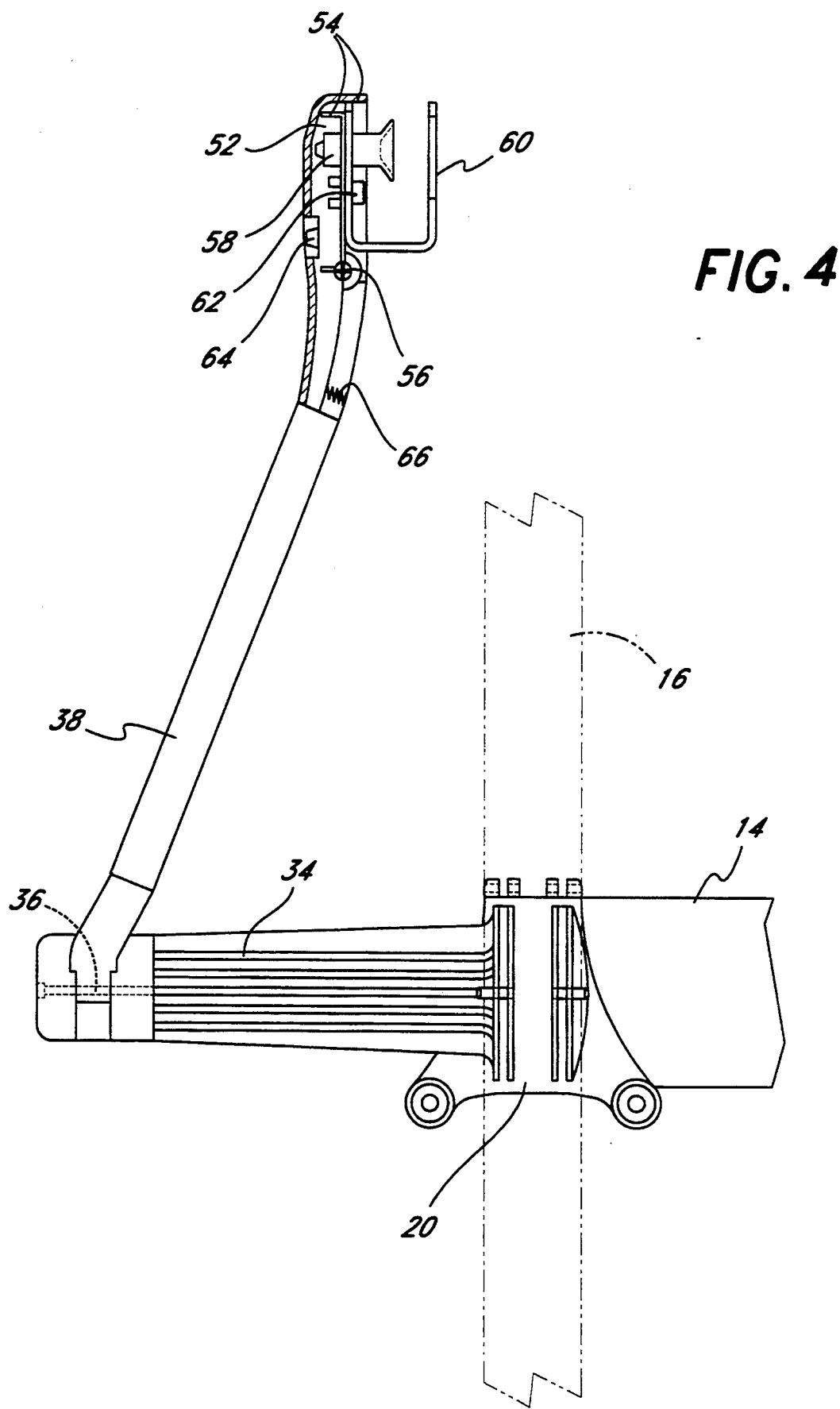
FIG. 4 is a top view, looking down on the roof of a vehicle, of the support arm and handle assembly in a down position.

FIG. 4 is a top view, looking down on the roof R of a vehicle V, wherein the supporting arm 38 and handle assembly 50 are pivoted about the support arm pivot 36 such that the support arm 38 is parallel to the tire bar 16. This position is the down position, which is used when there is no bike B which needs to be secured and transported.

Figure 5:
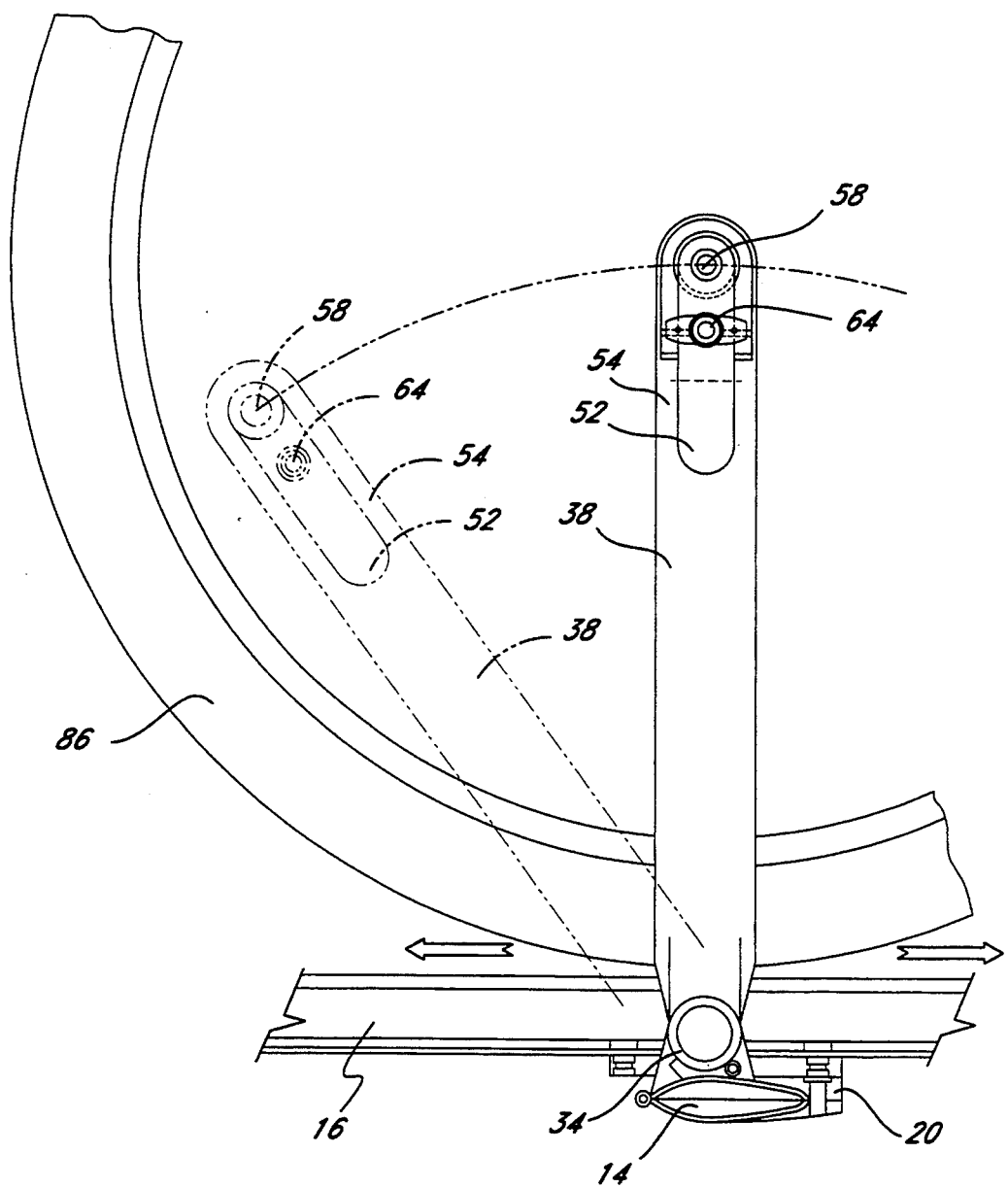
FIG. 5 is side detailed view of the support arm, with a phantom view of the support arm in a lower position to accommodate wheels of smaller radius.

FIG. 5 is a side view showing that, through the semi-circular rotation of the supporting arm 38 about the supporting arm pivot 36, the handle assembly 50 is capable of engaging wheels of various radius. For example, the phantom supporting arm 38 is shown in a position which would accommodate a smaller wheel. Since the second wheel holder 28 (better shown in FIG. 2), like the first wheel holder 22 (better shown in FIG. 1), can be moved back and forth on the tire bar 16, a smaller wheel can be moved in the direction of the phantom supporting arm 38 to meet and engage with the handle assembly 50 in its lower position.

Referring back now to FIGS. 2 and 3, the operation of the handle assembly and its ability to engage the bike frame 80 and wheel axle 82 combination will be described in detail.

Once the Second wheel 86 of the bicycle B has been secured to the tire bar 16 via the second wheel holder 28, the bike B can be further secured and stabilized to the ride-ready bike carrier system 10 by engaging the support arm 38 and handle assembly 50 to the bike frame 80 and wheel axle 82 combination.

First, to accommodate the size of the wheel 86, the second wheel holder 28, with the second wheel 86 attached, is moved in a direction along the tire bar 16 such that the support arm 38 and handle assembly 50 can be pivoted about the support arm pivot 36 to a level (as shown in FIG. 5) which allows for engagement with the bike frame 80 and wheel axle 82 combination.

Pressure is applied on the pivoting handle 52 on the portion below the pivoting handle pivot 56 such that the pivoting handle pivots about the pivoting handle pivot 56 into the open position. In this manner, the U-clamp 60, being adapted to engage the wheel axle 82 and bike frame 80 combination, can be swung into place and secured into position about the wheel axle 82 and bike frame combination 80, without the end of the wheel axle 82 abutting against the cone adjuster nut 58, which is retracted into the handle housing 54.

Once the U-clamp 60 is secured into position, the pivoting handle 52 is released back to its closed position by releasing the pressure on the lower portion of the pivoting handle 52 below the pivoting handle pivot 56, and by allowing the force of the spring 66 to exert an opposite pressure on the lower portion of the pivoting handle 52 thereby tensioning the pivoting handle 52 towards the closed position. When the pivoting handle 52 is returned to the closed position, the cone adjuster nut 58 comes into engagement with the end of the wheel axle 82. The cone adjuster nut 58 can be adjusted for tighter engagement with the end of the wheel axle 82.

Then, the locking mechanism 64 can be locked such that additional tension is added to the end of the wheel axle 82 for tighter engagement, and wherein the pivoting handle 52 remains in the closed position. Now, the support arm 38 and handle assembly 50 are able to provide security and stability to the bike B which is being transported via the ride-ready bike carrier system 10.

Thus, the reader will see that the ride-ready bike carrier system 10 of the present invention provides many benefits over the prior art. While the above description contains many specificities, these should not be construed as limitations on the scope of the invention, but rather as an exemplification of one preferred embodiment thereof. Many other variations are possible.

For example, the support arm 38 and handle assembly 50 can be attached to the first wheel 85 and bike frame 80 combination. In addition, the locking mechanism 64 can be designed with a key and a key hole (not shown) for locking and unlocking the locking mechanism 64. Furthermore, the extension arm 34 can be attached to the tire bar 16, or to the crossbar 12 or 14.

Accordingly, the scope of the present invention should be determined not by the embodiments illustrated above, but by the appended claims and their legal equivalents.

What is claimed is:

1. A ride-ready bike carrier system comprising
an extension arm for attachment to a roof rack system wherein a first end is capable of being attached to the roof rack system and a second end comprises a support arm pivot;
a support arm wherein a first end is connected to said support arm pivot in an interlocking pivotal relationship for a semi-circular rotational motion in a direction substantially parallel with a tire bar;
a handle assembly attached to a second end of said support arm, wherein said handle assembly engages a wheel axle for securing and stabilizing a bicycle mounted on said ride-ready bike carrier system;
said handle assembly further comprising a pivoting handle for pivoting about a pivoting handle pivot;
a cone adjuster nut integral to said pivoting handle for engaging a protruding end of said wheel axle;
a spring for exerting a pivotal force on said pivoting handle to keep said pivoting handle in a closed position;
a locking mechanism for exerting a retaining force upon said wheel axle, and for ensuring that said pivoting handle remains in a closed position;
a handle housing; and
a U-clamp integral to said handle housing for engagement about a circumference of said wheel axle.

2. A ride-ready bike carrier system comprising
a tire bar for attachment to a first and a second crossbar;
a first tire bar clamp for attaching said tire bar to said first crossbar, and a second tire bar clamp for attaching said tire bar to said second crossbar;
a first wheel holder and a second wheel holder attached to said tire bar between said first crossbar and said second crossbar, wherein said first and second wheel holder are adapted for receiving and securing a first and a second bicycle wheel to said first and second wheel holder, respectively;
said first wheel holder further comprising a first wheel holder strap for placement around said first bicycle wheel, and a first wheel lever for tightening said first wheel holder strap's grasp about said first bicycle wheel;
said second wheel holder further comprising a second wheel holder strap for placement around said second bicycle wheel, and a second wheel lever for tightening said second wheel holder strap's grasp about said second bicycle wheel;
an extension arm wherein a first end is attached to said second tire bar clamp, and a second end comprises a support arm pivot;
a support arm wherein a first end is connected to said support arm pivot in an interlocking pivotal relationship for a semi-circular rotational motion in a direction substantially parallel with said tire bar;
a handle assembly attached to a second end of said support arm, wherein said handle assembly engages a wheel axle for securing and stabilizing a bicycle mounted on said ride-ready bike carrier system;
said handle assembly further comprising
a pivoting handle for pivoting about a pivoting handle pivot;
a cone adjuster nut integral to said pivoting handle for engaging a protruding end of said wheel axle;
a spring for exerting a pivotal force on said pivoting handle to keep said pivoting handle in a closed position;
a locking mechanism for exerting a retaining force upon said wheel axle, and for ensuring that said pivoting handle remains in a closed position;
a handle housing; and
a U-clamp integral to said handle housing for engagement about a circumference of said wheel axle.

3. A ride-ready bike carrier system comprising
a tire bar for attachment to a first and a second crossbar;
a first tire bar clamp for attaching said tire bar to said first crossbar, and a second tire bar clamp for attaching said tire bar to said second crossbar;
a first wheel holder and a second wheel holder attached to said tire bar between said first crossbar and said second crossbar, adapted for receiving a first and a second bicycle wheel;

said first wheel holder comprising a first wheel holder strap for placement around said first bicycle wheel, and a first wheel lever for tightening said first wheel holder strap's grasp about said first bicycle wheel;

said second wheel holder comprising a second wheel holder strap for placement around said second bicycle wheel, and a second wheel lever for tightening said second wheel holder strap's grasp about said second bicycle wheel;

an extension arm wherein a first end is attached to said second tire bar clamp, and a second end comprises a support arm pivot;

a support arm wherein a first end is connected to said support arm pivot in an interlocking pivotal relationship for a semi-circular rotational motion in a direction substantially parallel with said tire bar;

a handle assembly attached to a second end of said support arm, wherein said handle assembly comprises
  a pivoting handle for pivoting about a pivoting handle pivot;
  a cone adjuster nut integral to said pivoting handle for engaging a protruding end of a wheel axle;
  a spring for exerting a pivotal force on said pivoting handle to keep said pivoting handle in a closed position;
  a locking mechanism for exerting a retaining force upon said wheel axle, and for ensuring that said pivoting handle remains in a closed position;
  a handle housing; and
a U-clamp integral to said handle housing for engagement about a circumference of said wheel axle.

* * * * *